(12) United States Patent
Al-Dhafeeri

(10) Patent No.: US 11,434,409 B2
(45) Date of Patent: Sep. 6, 2022

(54) WATER SHUTOFF USING ACID SOLUBLE CEMENT WITH POLYMER GELS

(71) Applicant: Saudi Arabian Oil Company, Dhahran (SA)

(72) Inventor: Abdullah M. Al-Dhafeeri, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 413 days.

(21) Appl. No.: 16/596,286

(22) Filed: Oct. 8, 2019

(65) Prior Publication Data

US 2021/0102110 A1 Apr. 8, 2021

(51) Int. Cl.
| | | |
|---|---|---|
| *C09K 8/42* | (2006.01) |
| *C04B 24/26* | (2006.01) |
| *C04B 28/04* | (2006.01) |
| *C04B 28/06* | (2006.01) |
| *C04B 28/08* | (2006.01) |
| *C04B 28/14* | (2006.01) |

(52) U.S. Cl.
CPC .......... *C09K 8/426* (2013.01); *C04B 24/2652* (2013.01); *C04B 28/04* (2013.01); *C04B 28/06* (2013.01); *C04B 28/08* (2013.01); *C04B 28/14* (2013.01)

(58) Field of Classification Search
CPC ..... C09K 8/426; C04B 24/2652; C04B 28/04; C04B 28/06; C04B 28/08; C04B 28/14
See application file for complete search history.

(56) References Cited

U.S. PATENT DOCUMENTS

| | | |
|---|---|---|
| 4,744,418 A | 5/1988 | Sydansk |
| 5,273,580 A | 12/1993 | Totten et al. |
| 5,842,519 A | 11/1998 | Sydansk |
| 5,849,674 A | 12/1998 | Fox et al. |
| 6,011,075 A | 1/2000 | Parris et al. |
| 6,156,819 A | 12/2000 | Lai et al. |
| 6,265,355 B1 | 7/2001 | Lai et al. |
| 6,387,986 B1 | 5/2002 | Moradi-Araghi et al. |
| 7,475,727 B2 | 1/2009 | Asghari et al. |
| 7,500,520 B2 | 3/2009 | Al-Dhafeeri et al. |
| 8,016,039 B2 | 9/2011 | Hodgins et al. |
| 8,360,151 B2 | 1/2013 | Williams et al. |
| 9,464,504 B2 | 10/2016 | Kakadjian et al. |
| 9,670,402 B2 | 6/2017 | Reddy et al. |

(Continued)

FOREIGN PATENT DOCUMENTS

CN 109761547 A 5/2019

OTHER PUBLICATIONS

Joseph et al., "A Review of Water Shutoff Treatment Strategies in Oil Fields", SPE International, SPE-136969, pp. 1-16, 2010.

(Continued)

*Primary Examiner* — Crystal J. Lee
(74) *Attorney, Agent, or Firm* — Bracewell LLP; Constance G. Rhebergen; Linda L. Morgan

(57) ABSTRACT

Compositions and methods for plugging a zone of a subterranean formation includes a cement composition having an acid soluble cement, a low molecular weight polymer, a high molecular weight polymer, and water. The acid soluble cement is in amount in a range of 10% to 50% by weight of the composition.

10 Claims, 3 Drawing Sheets

(56) References Cited

U.S. PATENT DOCUMENTS

| | | | | |
|---|---|---|---|---|
| 2001/0020057 A1* | 9/2001 | Audibert | ............... | C09K 8/46 |
| | | | | 524/2 |
| 2006/0021751 A1* | 2/2006 | Fyten | ............... | C04B 28/04 |
| | | | | 166/295 |
| 2014/0158354 A1* | 6/2014 | Kumar | ............... | C09K 8/487 |
| | | | | 166/292 |

OTHER PUBLICATIONS

Krumrine et al., "Profile Modification and Water Control With Silica Gel-Based Systems", Society of Petroleum Engineers of AIME, SPE-13578, pp. 317-328, 1985.

Sydansk et al., "Polymer Gels Formulated with a Combination of High and Low Molecular-Weight Polymers Provide Improved Performance for Water-Shutoff Treatments of Fractured Production Wells", Society of Petroleum Engineers Inc., SPE 89402, pp. 1-8, 2004.

International Search Report and Written Opinion of PCT Application No. PCT/US2020/054666 (SA51245) dated Jan. 18, 2021: pp. 1-16.

\* cited by examiner

WATER SHUTOFF USING ACID SOLUBLE CEMENT WITH POLYMER GELS

BACKGROUND

1. Field of the Disclosure

The present disclosure relates in general to plugging subterranean formations, and more particularly to controlling fluid production in subterranean wells used for hydrocarbon production operations.

2. Description of the Related Art

There may be times during the life of a subterranean well when an operator desires to improve the production performance of the subterranean well by plugging a portion or all of certain subterranean formations associated with such subterranean well. For example, an operator may wish to plug all or a portion of a particular subterranean formation to improve sweep treatments, shut-off water and gas production, shut-off gas in oil wells, abandon a particular zone, shut-off natural or propped fractures or otherwise alter the permeability of the subterranean formation.

Polymer gels can be used as a diverting or blocking agent in the treatment of injection and production wells in the oil industry. These treatments are termed as conformance improvement, which is a common practice to improve oil recovery from a heterogeneous hydrocarbon-bearing reservoir. In shutoff applications, a gelant can be injected through production wells to block or reduce the unwanted excess water or gas production.

SUMMARY OF THE DISCLOSURE

Embodiments of this disclosure provide compositions and methods for plugging a zone of a subterranean formation using acid-soluble cement with polymer gels formulated with a combination of high and low molecular-weight polymers. As an example, the compositions and methods can be effectively used to control water production in hydrocarbon reservoirs. Acid-soluble cement can be readily removed by injecting hydrochloric acid into a production zone if the cement enters or invades this zone. The compositions and methods can be used in high permeability matrix reservoirs and formations, and in fractures or other high permeability anomalies that are in direct contact with hydrocarbon production wells. As used in this disclosure, a high permeability is considered to be a permeability of more than ten Darcy in magnitude.

In an embodiment of this disclosure, a cement composition for plugging a zone of a subterranean formation includes an acid soluble cement, a low molecular weight polymer, a high molecular weight polymer, and water. The acid soluble cement is in amount in a range of 50% to 90% by weight of the cement composition.

In alternate embodiments, the low molecular weight polymer can have a molecular weight of less than 500,000 daltons. The low molecular weight polymer can be in an amount in a range of 0.5% to 2.0% by weight of the composition. The high molecular weight polymer can have a molecular weight of greater than 5,000,000 daltons. The high molecular weight polymer can be in an amount in a range of 0.5% to 1.5% by weight of the composition. The low molecular weight polymer and the high molecular weight polymer can be a polyacrylamide. The low molecular weight polymer and the high molecular weight polymer can be a biologically produced polymer.

In other alternate embodiments, the acid soluble cement can have an acid solubility greater than 45 at a time of one hour in a 15% hydrochloric acid solution. The acid soluble cement can be selected from a group consisting of a Portland cement, a Gypsum cement, a Joppa cement, a Dyckerhoff cement, a slag cement, a high aluminate cement, and combinations thereof. The water can be in an amount in a range of 300% to 1000% by weight of acid soluble cement. The water can be selected from a group consisting of freshwater, brackish water, seawater, and combinations thereof. The cement composition can further include a cross linking agent.

In an alternate embodiment of this disclosure, a method for plugging a zone of a subterranean formation with a cement composition includes delivering the cement composition through a bore of a subterranean well and into the zone of the subterranean formation. The cement compositing includes an acid soluble cement, a low molecular weight polymer, a high molecular weight polymer, and water. The acid soluble cement is in amount in a range of 10% to 50% by weight of the composition. The method further includes allowing the cement composition to set within the subterranean formation to plug the zone of the subterranean formation with the cement composition.

In alternate embodiments, a drawdown pressure of the subterranean well can be greater than 100 psi and the method can further include maintaining the plugging of the zone of the subterranean formation with the cement composition at the drawdown pressure. A temperature of the subterranean well can be greater than 93° C. and the method can further include maintaining the plugging of the zone of the subterranean formation with the cement composition at a temperature that is greater than 93° C. The method can further include injecting an acid into the subterranean well and dissolving a portion of the cement composition with the acid.

BRIEF DESCRIPTION OF THE DRAWINGS

So that the manner in which the above-recited features, aspects and advantages of the disclosure, as well as others that will become apparent, are attained and can be understood in detail, a more particular description of the embodiments of the disclosure briefly summarized above may be had by reference to the embodiments thereof that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION

The Specification, which includes the Summary of Disclosure, Brief Description of the Drawings and the Detailed Description, and the appended Claims refer to particular features (including process or method steps) of the disclosure. Those of skill in the art understand that the disclosure includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the meaning commonly understood by one of ordinary skill in the art to which this disclosure relates unless defined otherwise.

As used in the Specification and appended Claims, the singular forms "a", "an", and "the" include plural references unless the context clearly indicates otherwise. As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Spatial terms describe the relative position of an object or a group of objects relative to another object or group of objects. The spatial relationships apply along vertical and horizontal axes. Orientation and relational words including "uphole" and "downhole"; "above" and "below" and other like terms are for descriptive convenience and are not limiting unless otherwise indicated.

Where the Specification or the appended Claims provide a range of values, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the Specification and appended Claims to a method comprising two or more defined steps, the defined steps can be carried out in any order or simultaneously except where the context excludes that possibility.

Figure 1:
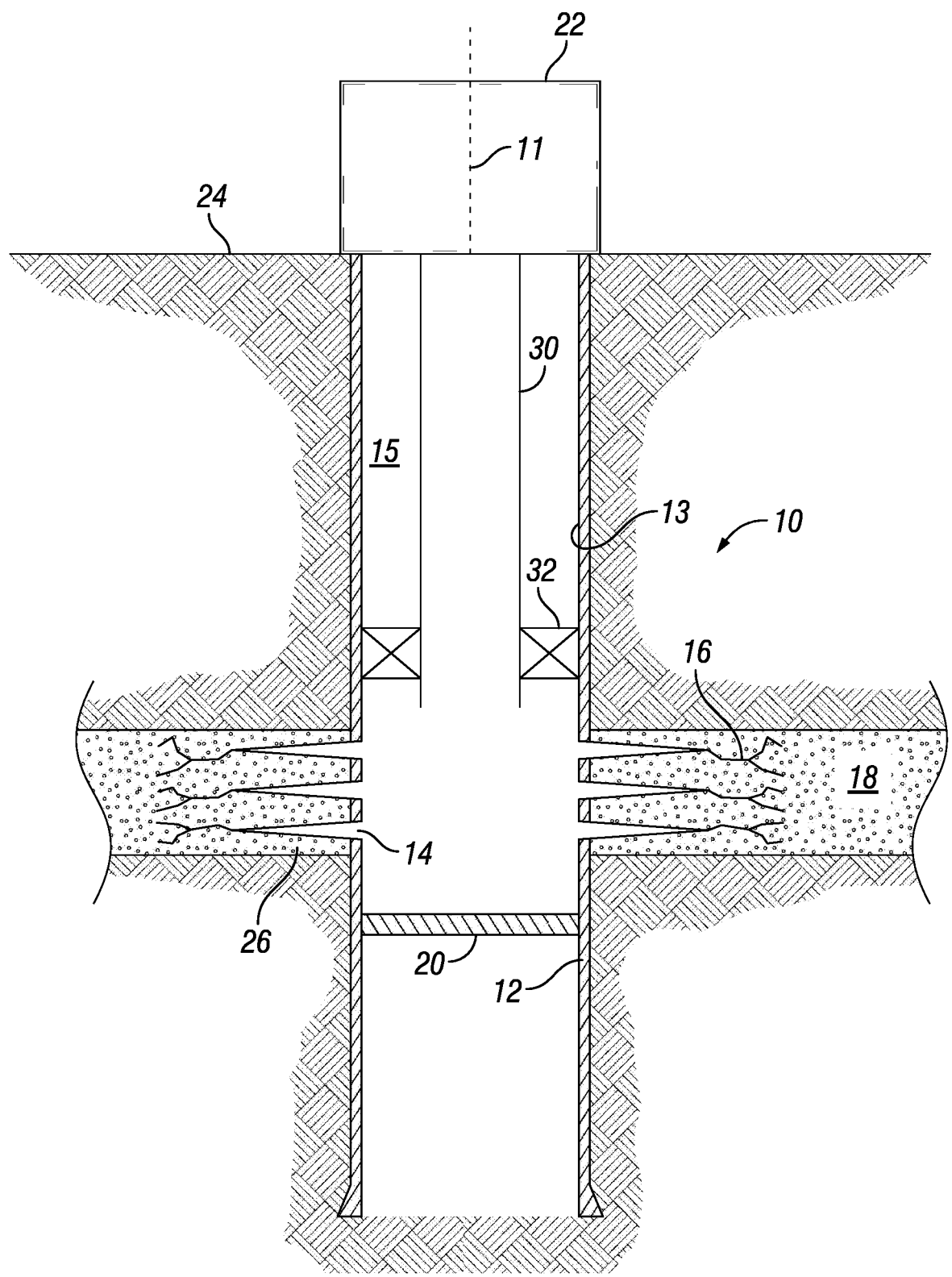
FIG. 1 is a schematic section view of a subterranean well, in accordance with an embodiment of this disclosure, shown before a cement composition is delivered into the subterranean well.

Looking at FIG. 1, subterranean well 10 can be a subterranean well used in hydrocarbon production operations. Subterranean well 10 can be a production well or an injection well. Subterranean well 10 can be lined with cement and casing 12 in a manner known in the art. Subterranean well 10 can have a central axis 11. Subterranean well 10 can be a vertical cased well, as shown, or can be open hole or can be angled or slanted, horizontal, or can be a multilateral well. Subterranean well 10 can have an inner diameter surface 13. Inner diameter surface 13 of subterranean well 10 can be the inner diameter surface of casing 12. Subterranean well 10 can have a wellbore 15 that can be an inner bore of casing 12. Perforations 14 can extend through the sidewall of casing 12. Perforations 14 can be in fluid communication with fractures 16 that extend into subterranean formation 18. Downhole packer 20 can seal against inner diameter surface 13 of casing 12 to prevent fluid flow past downhole packer 20 within casing 12.

FIG. 1 shows only one set of perforations 14 into one subterranean formation 18. In alternate embodiments there may be additional subterranean formations 18 and casing 12 can include additional sets of perforations 14 through casing 12 into such additional subterranean formations 18. A wellhead assembly 22 can be located at surface 24, such as an earth's surface, at an upper end of subterranean well 10.

Subterranean formation 18 can contain a fluid such as a liquid or gaseous hydrocarbon, water, steam, or a combination thereof. The fluid within subterranean formation 18 can pass through perforations 14 and into subterranean well 10.

During the life of subterranean well 10, it may be desirable to reduce or completely plug the flow of fluids within subterranean formation 18. As an example, an operator may wish to plug all or a portion of subterranean formation 18 to improve sweep treatments, shut-off water or gas production, abandon subterranean formation 18, shut-off fractures 16 or otherwise alter the permeability of subterranean formation 18.

In order to form a plug a zone of subterranean formation 18, cement composition 34 (FIG. 2) can be delivered into subterranean well 10. A distribution system can be used to deliver cement composition 34 into wellbore 15 of subterranean well 10 so that cement composition 34 penetrates pores of subterranean formation 18. The distribution system of the Example of FIG. 1 includes tubing 30 that extends within casing 12. Cement composition 34 can be delivered to subterranean formation 18 through tubing 30. Cement composition 34 can be injected for a sufficient depth so that cement composition 34 penetrates fractures 16 and also into the surrounding subterranean formation 18.

Tubing packer 32 can circumscribe tubing 30 and prevent fluids from passing tubing packer 32 through the annular space between the outer diameter of tubing 30 and the inner diameter surface 13 of subterranean well 10. Downhole packer 20 limits the downward travel of cement composition 34 within casing 12. Looking at FIG. 2, cement composition 34 can be pumped through tubing 30 into wellbore 15 and pass through perforations 14 of casing 12 to penetrate pores of subterranean formation 18. In order to avoid cement dehydration while cement composition 34 is being pumped through tubing 30 and into wellbore 15, cement composition 34 can be injected as rapidly as possible without exceeding formation parting or fracturing pressure. Cement composition 34 can be injected into fracture 16 and into the surrounding subterranean formation 18 the injection rate can be increased to increase the amount of cement composition 34 with a pump time that is less than the curing onset time of cement composition 34.

Figure 2:
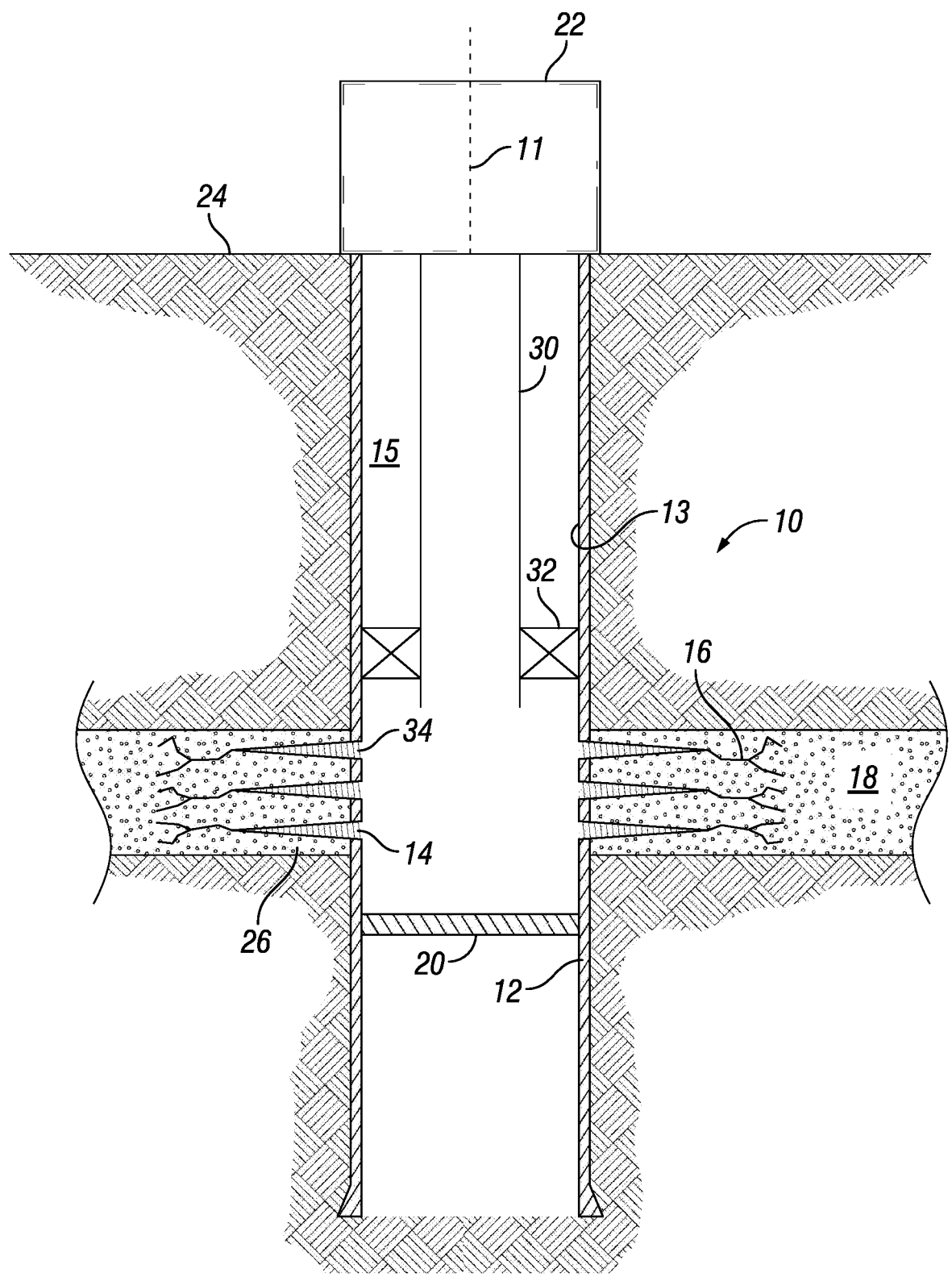
FIG. 2 is a schematic section view of a subterranean well, in accordance with an embodiment of this disclosure, shown after a cement composition is delivered into the subterranean well.

As shown in FIG. 2, cement composition 34 can plug each of the perforations 14 as well as fractures 16. A cement composition 34 at a given curing onset time, the cement composition 34 can penetrate deeper through the perforations into fracture 16 and into the surrounding subterranean formation 18 if injected as rapidly as practical without exceeding formation parting or fracture pressure. Cement composition 34 can set within perforations 14, fractures 16, and other anomalies within subterranean well 10. Cement composition 34 can be designed to have composition to be operable at a particular injection rate and temperature so that cement composition 34 sets within perforations 14, fractures 16, and other anomalies within subterranean well 10. The time for cement composition 34 to cure can be, for example, in a range of one to twenty-four hours. In alternate examples, curing time can be in a range of a number of days. The curing time can be controlled by the selection of the composition of cement composition 34 and the environment conditions within the location where cement composition 34 is set. Curing plays an important role in strength development and durability of cement composition 34. After placement of cement composition 34 within subterranean well 10, subterranean well 10 is shut-in to allow the gelant solution to mature and set up. Subterranean well 10 can be shut in for the length of time required for cement composition 34 to reach near-full strength. An over-flush treatment is performed following the injection of cement composition 34.

The ability of a gel to withstand high pressure gradients decreases with increasing aperture size. Currently available compositions that include a gel alone cannot generally withstand high pressure gradients of the size of the aperture is larger than 2 mm. On the other hand, currently available cement compositions generally cannot be placed effectively through small or constricted flow paths. Cement compositions 34 of this disclosure can plug perforations 14, fractures 16, and other anomalies with apertures in a range of 2 mm to 50 mm. In particular, cement compositions 34 of this disclosure can plug perforations 14 or other anomalies with apertures in a range of 2 mm to 50 mm where such apertures intersect with wellbore 15.

Figure 3:
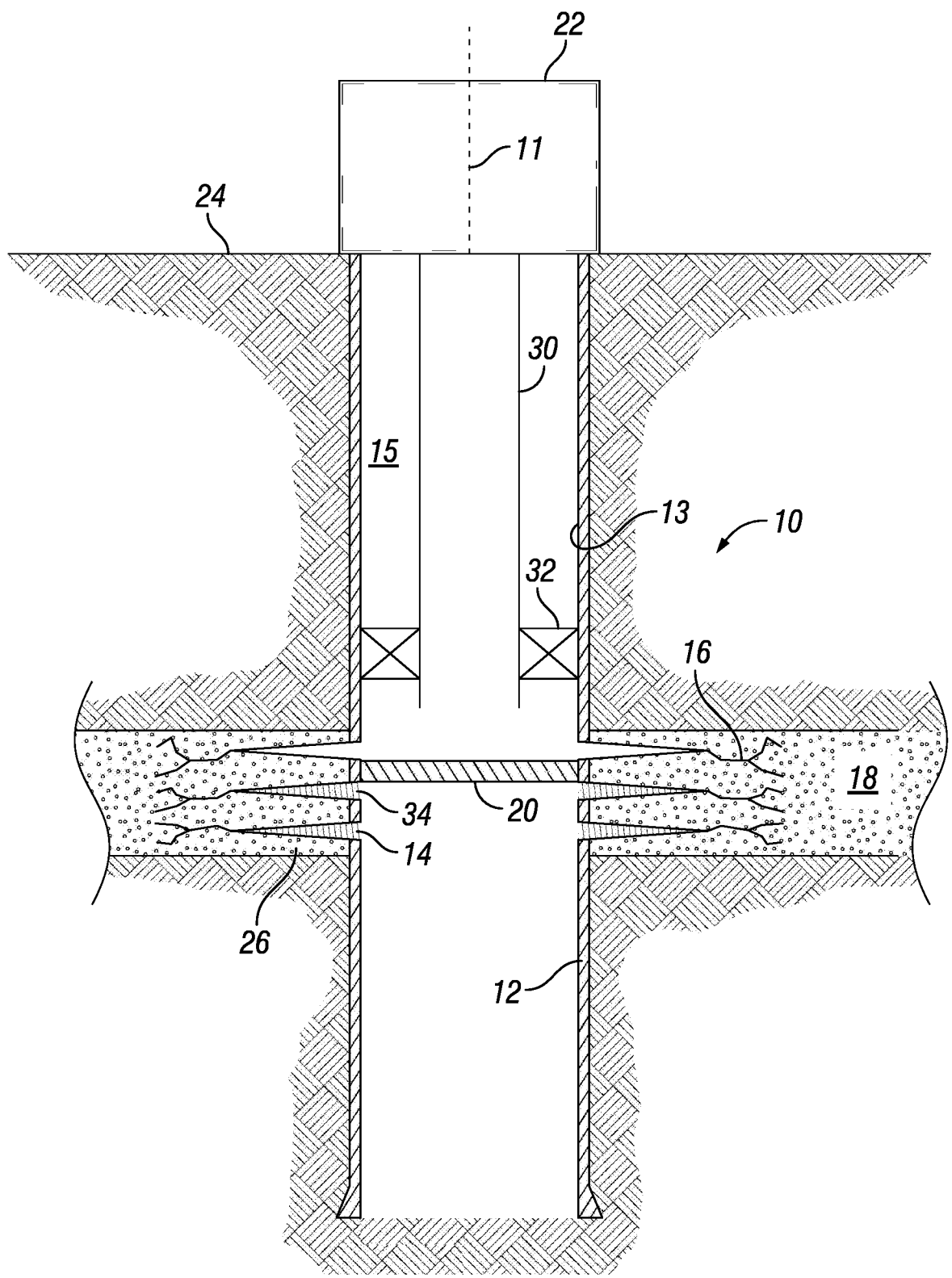
FIG. 3 is a schematic section view of a subterranean well, in accordance with an embodiment of this disclosure, shown after an acid is injected into the subterranean well.

If it is desired to clean out or remove a portion of cement composition 34, an acid can be injected into subterranean well 10. The acid soluble cement of cement composition 34 can be removed by the acid, which will cause the removal of cement composition 34. Looking at FIG. 3, if an operator desires, for example, to remove cement composition 34 from a portion of subterranean formation 18, downhole packer 20 can be positioned to isolate such portion of subterranean formation 18 from other parts of subterranean formation 18. The acid can then be injected into subterranean well 10 dissolve a portion of cement composition 34 that is uphole of downhole packer 20.

Cement composition 34 can include an acid soluble cement, a low molecular weight polymer, a high molecular weight polymer, and water. In certain embodiments, cement composition 34 can further include a cross linking agent.

The acid soluble cement can be in an amount in a range of 50% to 90% by weight of the cement composition. The acid soluble cement has an acid solubility greater than 45 wt % at a time of one hour in a 15% hydrochloric acid solution. The acid solubility of the cured onset cement composition 34 can be increased more than 65 wt % at a time of two hours in a 15% HCl solution. The expected percentage of acid solubility of cured onset cement composition 34 can be reached at least more than 80 wt % at the bottomhole temperature and pressure conditions within the perforations 14, fractures 16, and other anomalies within subterranean well 10 at a given contact time for 4 hours with 15 wt % an acid. The percentage of acid solubility should be effective and sufficient to remove a desired amount of the cured onset cement composition 34 from the perforations 14, fractures 16, and other anomalies within subterranean well 10. The acid soluble cement can be, for example, Portland cement, Gypsum cement, Joppa cement, Dyckerhoff cement, slag cement, high aluminate cement, or combinations thereof.

The low molecular weight polymer can be in an amount in a range of 0.5% to 2.0% by weight of the composition. As used in this specification, a low molecular weight polymer is a polymer with a molecular weight of less than 500,000 daltons. As an example, the low molecular weight polymer can be a synthetic polymer such as polyacrylamide. In alternate example embodiments, the low molecular weight polymer can be a biologically produced polymer, such as xanthan gum and cellulose.

By including a low molecular weight polymer in cement composition 34 that contains high molecular weight polymer the low molecular weight polymer can impart a minor increase in viscosity to the gelant solution, while substantially improving the strength and thermal stability of cement composition 34. In addition, there is an upper concentration limit for incorporating relatively high molecular weight partially hydrolyzed polyacrylamide into polymer-gel formulations. This upper concentration limit is set by the upper viscosity limit that can be tolerated during pumping and placement of the cement composition. Therefore, including low molecular weight polymer in cement composition 34 is beneficial for pumping and placement of the cement composition 34 into the perforations 14, fractures 16, and other anomalies within subterranean well 10. As the concentration of high molecular weight polymer increases above a threshold value, the addition of low molecular weight polymer provides cement composition 34 with improved strength and stability that is comparable to addition of the same amount of high molecular weight polymer. In such an embodiment, both polymer chains are long enough to form effective crosslinks within cement composition 34.

The high molecular weight polymer can be in an amount in a range of 0.5% to 1.5% by weight of the composition. As used in this specification, a high molecular weight polymer is a polymer with a molecular weight of greater than 5,000,000 daltons. As an example, the low molecular weight polymer can be a synthetic polymer such as polyacrylamide. In alternate example embodiments, the low molecular weight polymer can be a biologically produced polymer, such as xanthan gum and cellulose. By adding the high molecular weight polymer to cement composition 34, cement composition 34 can be used for plugging fractures 16 with large apertures, such as apertures with a size greater than 5 mm, or can be used for plugging in environments with large drawdown pressures. By including a high molecular weight polymer the mechanical strength, the thermal and chemical stability, and the durability of cement composition 34 can be improved.

The water can be in an amount in a range of 300% to 1000% by weight of acid soluble cement. The water can be, as an example, freshwater, brackish water, seawater, or combinations thereof. The amount of water can be selected to provide the desired percentage of acid solubility under the conditions of the particular well. The higher the concentration of added water into the solution, the higher the permeability of the onset cement composition 34. The higher the permeability of onset cement composition 34 the greater the dissolution of onset cement composition 34 because an acid can penetrate into and through onset cement composition 34 a greater amount within a given time. In addition, the presence of divalent cations in the mixing water can decrease the curing time and may cause precipitations which affect the structure of cement composition 34. The total dissolved solids and the salinity of the water used for cement composition 34 can also affect the overall performance of cement composition 34 in terms of mechanical strength, thermal stability, and curing time.

The cross linking agent can be a metallic or organic cross linker. The cross linking agent can be in an amount in a range of 0.05% to 5.0% by weight of the composition. The combination of high molecular weight and low molecular weight polymers systems can be cross linked with the cross linking agent to produce a three dimensional polymer structure for improved chemical stability relative to a composition that does not include a cross linking agent. The concentration of the crosslinking agent has a significant effect on the gel strength. However, the process of excessive crosslinking can result in expulsion of water from the gel structure and significant shrinkage of gel volume. This phenomenon is known as gel synersis, and is considered to be an instability of the gel network. Chemical additives can be added to control the rate of crosslinking and the effect of precipitation. Heat stabilizer chemicals can be used to prevent thermal polymer degradation. The cross linking agent can be, for example, a metal of chromium, zirconium, titanium, or aluminum. In alternate embodiments, the cross linking agent can be N,N'-methylenebisacrylamide, polyethyleneimine, or Glutaraldehyde.

In an example of operation, cement composition 34 can be used to plug a zone of subterranean formation 18. Cement composition 34 can be formed by mixing polymer gels formulated with a combination of high and low molecular weight polymers and an acid soluble cement that provides the desired rheological and mechanical properties to control water production in hydrocarbon reservoirs. Cement composition 34 is easy to mix due to cement composition 34 having a low viscosity to help in full-coverage placement into the perforations 14, fractures 16, and other anomalies within subterranean well 10.

In order to prepare cement composition 34 the required fresh water can be added to a clean mixing container. The mixing container is then placed on a mixer base to start agitation. The motor base should be adjusted from 3,000 up to 5,000 revolutions per minute "rpm" (+/−300 rpm). An acid-soluble cement with gelant polymers and other additives are added to the container. The acid-soluble cement with gelant polymers can be considered and blended at different times during the mixing process. The resulting cement composition 34 composition is mixed at 5,000 rpm (+/−300 rpm) over a time period of 2 to 5 minutes.

The mixing equipment used can be, for example, a tank jet mixer or a batch mixer. The required volume of cement composition 34 can then be pumped into the wellbore 15. Cement composition 34 can be pumped with a cement unit that can provide an injectivity rate of 2, 4, or 6 bbl/minute. A spacer fluid can be used to flush the lines used to pump cement composition 34 into wellbore 15. As an example, spacer fluid in an amount from 5 to 10 bbl can be pumped to flush the lines. In some embodiments, the mixing equipment can be placed on one or more cement trucks. In some embodiments, a tank jet mixer can be used to provide a continuous mixing process for cement composition 34 for pumping into the wellbore 15.

During the pumping process, cement composition 34 develops early static gel strength and compressive strength at a range of temperature from 22° C. to 66° C. The thickening time of cement composition 34 will be dependent on temperature. In an example embodiment, cement composition 34 can have a thickening time in the range of about 6 to about 16 hours at a temperature of 24° C. In another example embodiment, cement composition 34 can have a setting time of less than 48 hours, preferably less than 24 hours, at the bottomhole temperature of the subterranean formation. The resulting cement composition 34 can have a compressive strength greater than 100 psi at the bottomhole temperature of the subterranean formation.

Cement composition 34 can be delivered through a bore of subterranean well 10 and into the zone of subterranean formation 18. Cement composition 34 can set within subterranean formation 34 to plug the zone of subterranean formation 18 with cement composition 34.

Subterranean well 10 can have a drawdown pressure that is greater than 100 psi. Cement composition 34 can maintain the plugging of the zone of subterranean formation 18 with cement composition 34 at the drawdown pressure. As the concentration of high molecular weight polymer increases above a threshold value, the addition of low molecular weight polymer can provide improved strength and stability to cement composition 34 that are comparable to addition of the same amount of high the cement composition 34 polymer. However, the ability of polymer gels to withstand high-pressure gradients decreases with increasing the aperture size and in general, gel alone cannot withstand high-pressure gradients if the size of the aperture is larger than 2 mm. Cement composition 34 of embodiments of this disclosure can have a compressive strength greater than 100 psi at the bottomhole temperature of a subterranean formation. If the size of the aperture is larger than 2 mm without flow restrictions, cement compositions 34 can successfully be used to plug perforations 14, fractures 16, and other anomalies.

During experimental testing, when a polymer gel alone was placed in a 4-mm-aperture fracture, water first breached the polymer gels at a pressure gradient of 25 psi/ft. Cement composition 34 developed an improved compressive strength compared to the polymer gel used alone due to improvements in the rheological and mechanical properties with the addition of acid-soluble cement to such polymer gel. Embodiments of cement composition 34 can have a compressive strengths in a range from 100 psi to over 10,000 psi.

Subterranean well 10 can have a temperature that is greater than 93° C. Cement composition 34 can maintain the plugging of the zone of the subterranean formation with the cement composition at a temperature that is greater than 93° C. A polymer gel alone can perform effectively at temperatures below 24° C. The addition of acid-soluble cement to such polymer gel provides improved thermal stability. As an example, cement composition 34 contains dissolved solid, and resulted in attaching other materials together when mixed with water. Such characteristics of cement composition 34 can improve the thermal stability compared to the polymer gel alone. Cement composition 34 can include minerals that influence the behavior of cement composition 34 when exposed to greater temperatures, such as through minerals—cement paste bonds.

Certain currently available gels or polymer mixtures used for plugging subterranean formations have limited stability in harsh reservoir conditions, such as at elevated temperature and high salinity. Such harsh reservoir conditions can lead to the degradation of the gel or polymer mixture when injected into a reservoir over a long period of time. In addition, such gel or polymer mixtures may result in the creation of oxygen, which in turn could create a damaging reaction with metals or metal ions. Cement composition 34 does not degrade by exposure to oxygen. A polymer gel alone can break down in a downhole environment due to the high temperature, presence of moisture, and oxygen to which the polymer gel is exposed. Cement composition 34 provides improved chemical stability and durability compared to the polymer gel alone. Cement composition 34 contains dissolved solids which allow for attaching other materials together when mixed with water, and can improve the chemical stability and durability. The mineralogy of cement composition 34 can include minerals that improve the performance of cement composition 34 when cement composition 34 is exposed to gases such oxygen and hydrogen sulfide. Cement composition 34 further has as a desired rheology, thickening time, and compressive strength which improves the chemical stability and durability of the composition compared to the polymer gel alone.

Embodiments of this disclosure therefore disclose a cement composition that utilizes an acid soluble cement with polymer gels formulated with a combination of high and low molecular weight polymers can improve the performance of the composition, including improving the strength of polymer gels that are used to treat both matrix formation and fractures and other high permeability anomalies which are in direct contact with production wells. The cement composition can assist in minimizing water production and maintaining the oil flow rate of wells. The system can also improve the productivity of hydrocarbon wells. Further, the acid soluble cement and polymer gels can be cleaned out by regular acid treatment and removed if the cement composition invaded into the reservoirs.

Embodiments described herein, therefore, are well adapted to carry out the objects and attain the ends and advantages mentioned, as well as others inherent therein. While certain embodiments have been described for purposes of disclosure, numerous changes exist in the details of procedures for accomplishing the desired results. These and other similar modifications will readily suggest themselves to those skilled in the art, and are intended to be encompassed within the scope of the present disclosure disclosed herein and the scope of the appended claims.

What is claimed is:

1. A cement composition for plugging a zone of a subterranean formation, the cement composition including:
   an acid soluble cement;
   a low molecular weight polymer, where the low molecular weight polymer has a molecular weight of less than 500,000 daltons;
   a high molecular weight polymer, where the high molecular weight polymer has a molecular weight of greater than 5,000,000 daltons; and
   water; where the acid soluble cement is in amount in a range of 50% to 90% by weight of the cement composition; and where the low molecular weight polymer and the high molecular weight polymer are part of a partially hydrolyzed polyacrylamide polymer-gel.

2. The cement composition of claim 1, where the low molecular weight polymer is in an amount in a range of 0.5% to 2.0% by weight of the composition.

3. The cement composition of claim 1, where the high molecular weight polymer is in an amount in a range of 0.5% to 1.5% by weight of the composition.

4. The cement composition of claim 1, where the low molecular weight polymer and the high molecular weight polymer are a biologically produced polymer.

5. The cement composition of claim 1, where the acid soluble cement has an acid solubility greater than 45 at a time of one hour in a 15% hydrochloric acid solution.

6. The cement composition of claim 1, where the acid soluble cement is selected from a group consisting of a Portland cement, a Gypsum cement, a Joppa cement, a Dyckerhoff cement, a slag cement, a high aluminate cement, and combinations thereof.

7. The cement composition of claim 1, where the water is in an amount in a range of 300% to 1000% by weight of acid soluble cement.

8. The cement composition of claim 1, where the water is selected from a group consisting of freshwater, brackish water, seawater, and combinations thereof.

9. The cement composition of claim 1, further including a cross linking agent.

10. The cement composition of claim 1, where the low molecular weight polymer and the high molecular weight polymer are a polyacrylamide.

* * * * *